(12) United States Patent
Beier et al.

(10) Patent No.: US 9,915,789 B2
(45) Date of Patent: Mar. 13, 2018

(54) OPTICAL ADAPTOR FOR MOUNTING TO A RECEPTACLE TO OPTICALLY COUPLE CONNECTORIZED OPTICAL CABLES

(71) Applicant: CCS Technology, Inc., Wilmington, DE (US)

(72) Inventors: Joachim Rudolf Beier, Munich (DE); Wolf Peter Kluwe, Hagen (DE); Jürgen Matthies, Wetter (Ruhr) (DE); Gordon Mueller-Schlomka, Berlin (DE); Martin Schulte, Wildau (DE); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/435,548

(22) Filed: Feb. 17, 2017

(65) Prior Publication Data

US 2017/0160478 A1 Jun. 8, 2017

Related U.S. Application Data

(63) Continuation of application No. PCT/US2015/047868, filed on Sep. 1, 2015.

(30) Foreign Application Priority Data

Sep. 4, 2014 (EP) .................................... 14183581

(51) Int. Cl.
*G02B 6/38* (2006.01)

(52) U.S. Cl.
CPC ......... *G02B 6/3825* (2013.01); *G02B 6/3821* (2013.01); *G02B 6/3874* (2013.01); *G02B 6/3891* (2013.01); *G02B 6/3893* (2013.01)

(58) Field of Classification Search
CPC .. G02B 6/3825; G02B 6/3821; G02B 6/3874; G02B 6/3891; G02B 6/3893

(Continued)

(56) References Cited

U.S. PATENT DOCUMENTS

| 5,274,729 A | 12/1993 | King et al. |
| 5,297,227 A | 3/1994 | Brown et al. |

(Continued)

FOREIGN PATENT DOCUMENTS

| CN | 102868447 A | 1/2013 |
| EP | 0967497 A1 | 12/1999 |

(Continued)

OTHER PUBLICATIONS

Patent Cooperation Treaty, International Search Report and Written Opinion for PCT/US15/47869, dated Jan. 5, 2016, 11 pages.

(Continued)

*Primary Examiner* — Jerry Blevins
(74) *Attorney, Agent, or Firm* — Michael E. Carroll, Jr.

(57) ABSTRACT

An optical adaptor for mounting to a receptacle to optically couple connectorized optical cables comprises a coupling element to provide a passageway for inserting a ferrule of a first optical connector to terminate a first one of the connectorized optical cables and a ferrule of a second optical connector to terminate a second one of the connectorized optical cables to optically couple the first and the second connectorized optical cable. The optical adaptor further comprises a mounting element being mountable to the receptacle to hold the optical adaptor. The mounting element is configured to receive the coupling element.

17 Claims, 9 Drawing Sheets

(58) Field of Classification Search
USPC .......................................................... 385/60
See application file for complete search history.

(56) References Cited

U.S. PATENT DOCUMENTS

| | | | |
|---|---|---|---|
| 5,537,501 A | 7/1996 | Iwano et al. | |
| 6,102,581 A | 8/2000 | Deveau et al. | |
| 6,149,315 A * | 11/2000 | Stephenson | G02B 6/266 385/60 |
| 6,341,191 B1 | 1/2002 | Takahashi | |
| 6,648,520 B2 | 11/2003 | McDonald et al. | |
| 6,802,653 B2 | 10/2004 | Deane | |
| 8,480,310 B2 | 7/2013 | Kewitsch | |
| 2003/0095779 A1 | 5/2003 | Chang | |
| 2006/0088248 A1 | 4/2006 | Tran et al. | |
| 2009/0202214 A1 * | 8/2009 | Holmberg | G02B 6/4446 385/135 |
| 2009/0282214 A1 | 11/2009 | Kuesel et al. | |
| 2012/0263419 A1 | 10/2012 | Briggs et al. | |
| 2014/0044394 A1 | 2/2014 | Lin | |
| 2014/0133804 A1 | 5/2014 | Lu et al. | |
| 2016/0139343 A1 * | 5/2016 | Dean, Jr. | G02B 6/3869 385/78 |

FOREIGN PATENT DOCUMENTS

| | | |
|---|---|---|
| ES | 1110189 U | 5/2014 |
| ES | 1110189 Y | 8/2014 |
| JP | 2006258861 A | 9/2006 |
| JP | 2009103837 A | 5/2009 |
| WO | 2015197588 A1 | 12/2015 |

OTHER PUBLICATIONS

Patent Cooperation Treaty, International Search Report and Written Opinion for PCT/US2015/047868, dated Jan. 7, 2016, 11 pages.
Patent Cooperation Treaty, International Search Report and Written Opinion for PCT/US2015/047872, dated Dec. 21, 2015, 10 pages.
Patent Cooperation Treaty, International Search Report and Written Opinion for PCT/US2015/059430, dated Jun. 1, 2016, 15 pages.
Commscope, "Hardenecl Drop Cable and Connector Solultions," http://www.commscope.com/Docs/Hardened-Drop-Cable-and-Connector-Solutions-311638BE.pdf, 4 pages.
Replica (Reply) from the ES UTM opposition No. U201431271 filed Jan. 23, 2015.
European Patent Application No. 14183581.9 Office Action dated May 29, 2017; 5 Pages; European Patent Office.

* cited by examiner

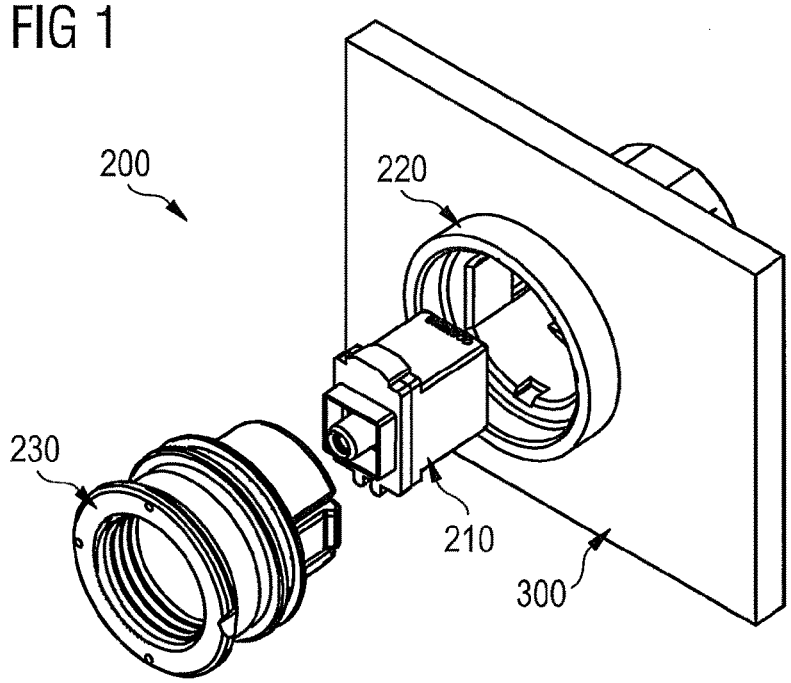
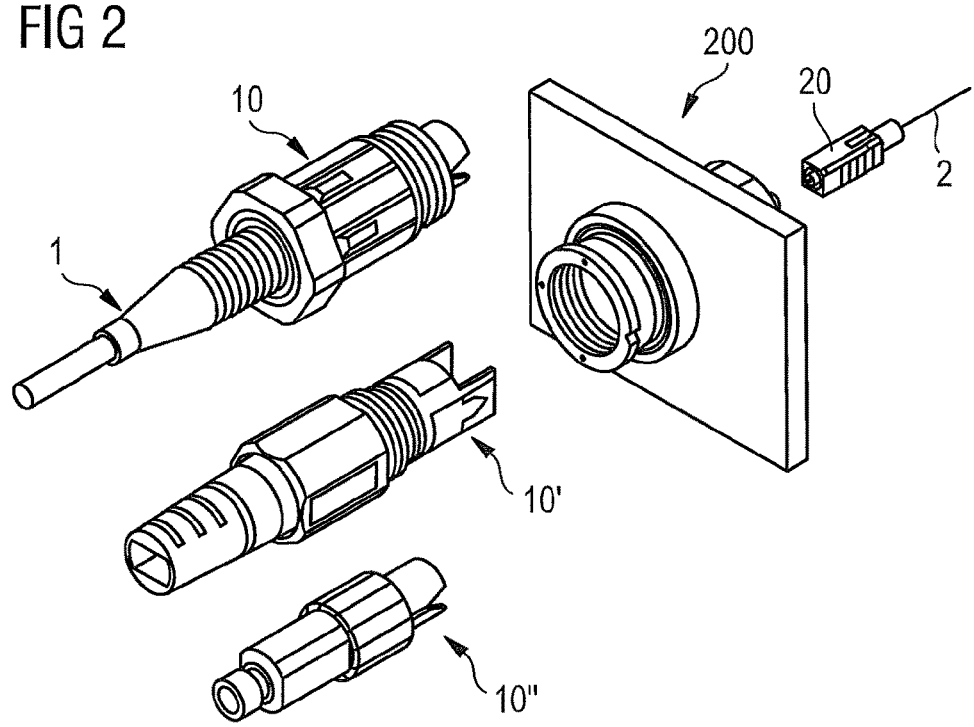

OPTICAL ADAPTOR FOR MOUNTING TO A RECEPTACLE TO OPTICALLY COUPLE CONNECTORIZED OPTICAL CABLES

CROSS-REFERENCE TO RELATED APPLICATIONS

This application is a continuation of International Application No. PCT/US2015/47868, filed on Sep. 1, 2015, which claims the benefit of priority under 35 U.S.C. § 119 of European Patent Application Serial No. 14183581.9, filed on Sep. 4, 2014, the content of which is relied upon and incorporated herein by reference in their entirety.

FIELD

The present disclosure relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The disclosure further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementarily shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables in order to guarantee a precise coupling of the optical fibers included in the optical cables. In order to couple a first and a second cable with connectors on them, for example, preconnectorized optical cable, a first optical connector terminating the first optical cable may be inserted in the receptacle at a first side of the receptacle, and a second optical connector terminating the second optical cable may be inserted in the receptacle at a second side of the receptacle.

The receptacle provides at least a mounting function for the optical connectors terminating the optical cables. The receptacle may also provide a mechanical coupling function for the optical connectors and an optical coupling function for the optical fibers of the optical cables. In order to provide the mechanical and optical coupling function the receptacle may comprise a coupling element. The coupling element is usually configured to receive the first optical connector at a first side of the coupling element and to receive the second connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized optical cables such as preconnectorized optical cables which allows a precise alignment of the optical fibers of the connectorized optical cables. There is also a desire to provide an optical assembly to optically couple connectorized optical cables such as preconnectorized optical cables to ensure a precise alignment of the optical fibers of the connectorized optical cables.

SUMMARY

An embodiment of an optical adaptor for mounting to a receptacle to optically couple connectorized optical cables is specified in claim 1.

According to an embodiment of an optical adaptor for mounting to a receptacle to optically couple connectorized optical cables, the optical adaptor comprises a coupling element to provide a passageway for inserting a ferrule of a first optical connector to terminate a first one of the connectorized optical cables and a ferrule of a second optical connector to terminate a second one of the connectorized optical cables to optically couple the first and the second connectorized optical cable. The optical adaptor further comprises a mounting element being mountable to a receptacle to hold the optical adaptor, wherein the mounting element is configured to receive the coupling element. The mounting element is configured to mechanically couple the first optical connector to the mounting element so that the ferrule of the first optical connector intrudes in the passageway of the coupling element at a first side of the coupling element. The coupling element has a second side to mechanically couple the second optical connector to the coupling element such that the ferrule of the second optical connector intrudes in the passageway of the coupling element.

An embodiment of an optical assembly to optically couple connectorized optical cables is specified in claim 11.

According to an embodiment of the optical assembly to optically couple connectorized optical cables, the optical assembly comprises the optical adaptor for mounting to a receptacle to optically couple connectorized optical cables as specified above. The optical assembly further comprises a receptacle to hold the optical adaptor. The receptacle is formed as a hollow body to receive the coupling element and the mounting element of the optical adaptor.

BRIEF DESCRIPTION OF THE DRAWINGS

FIG. 1 is a perspective view of a receptacle to couple connectorized optical cables such as preconnectorized optical cables;

FIG. 2 shows first optical connectors of a different type to be connected to a second optical connector by a receptacle;

DETAILED DESCRIPTION

Figure 3:
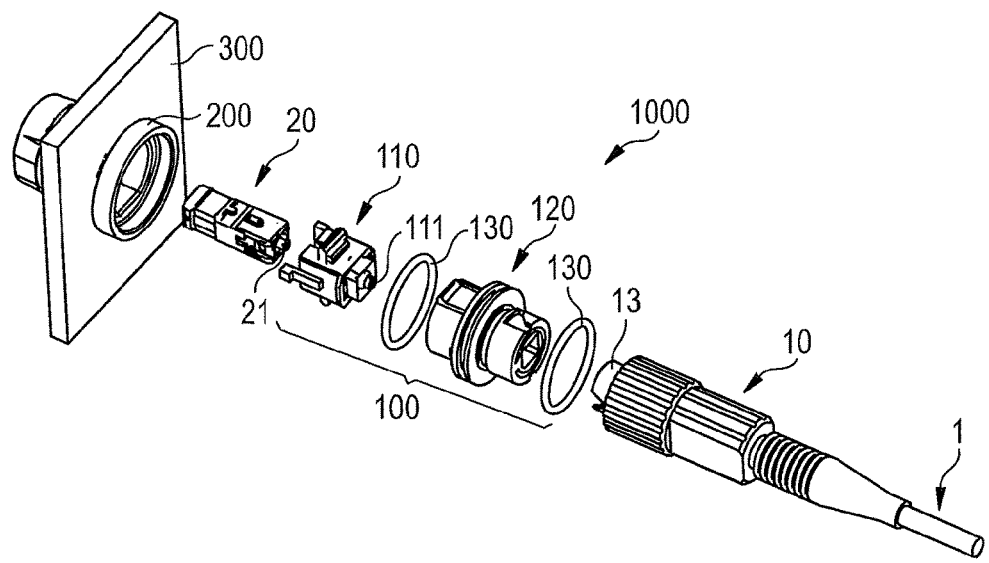
FIG. 3 shows an exploded view of an arrangement of an optical assembly to couple connectorized optical cables with two optical connectors.

The concepts will now be described in more detail hereinafter with reference to the accompanying drawings showing preferred embodiments. The application may, however, be embodied in many different forms and should not be construed as limited to the embodiments set forth herein; rather, these embodiments are provided so that the disclosure will fully convey the scope of the concepts to those skilled in the art. The drawings are not necessarily drawn to scale but are configured to clearly illustrate the concepts.

FIG. 1 shows an embodiment of a receptacle 200 comprising a coupling element 210 to which an optical connector terminating an optical cable, for example a fiber optic drop cable, may be connected. The receptacle 200 comprises a fixture 220 arranged in a bore hole of a housing 300 such as a housing of a distribution closure. The receptacle 200 comprises a fixation adaptor 230 which may be mounted to the fixture 220 by inserting the fixation adaptor into the fixture 220. The fixation adaptor 230 may comprise snap hooks to engage the fixation adaptor 230 to the fixture 220 and to securely hold the fixation adaptor 230 inside the fixture 220. The coupling element 210 may be inserted and securely held in the fixation adaptor 230. The coupling element 210 is configured to connect a first optical connector terminating a first optical cable to a second optical connector terminating a second optical cable. The coupling element 210 is further configured to optically couple an optical fiber of the first optical cable to an optical fiber of the second optical cable.

FIG. 2 shows a connectorized optical cables such as a preconnectorized optical cable 1, for example a fiber optic drop cable, which is terminated at its end by an optical connector 10 of a first type. FIG. 2 shows other optical connectors 10' and 10" being of a different second and third type. Another optical cable 2 is terminated at its end by optical connector 20 being of a fourth type. The optical connector 20 may be configured as a connector of a SC industrial standard type. The receptacle 200 comprises the coupling element 210, the fixture 220 and the fixation adaptor 230 as illustrated in FIG. 1. Several industrial standard connector types are available such as SC connector, ST connector or LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 200 is configured to optically couple the preconnectorized optical cable 1 being terminated with the optical connector 10 to the preconnectorized optical cable 2 being terminated with the optical connector 20. In particular, the optical connector 10 may be connected to the coupling element 210 at the front side of the coupling, and the optical connector 20 may be fixed to the coupling element 210 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 200 and particularly the coupling element 210, the fixture 220 and the fixation adaptor 230 of the receptacle are usually adapted to couple specific types of optical connectors to each other. The receptacle 200 may be designed to couple the optical connector 10 of the first type to the optical connector 20 of the fourth type. However, the receptacle 200 is not configured to couple the optical connector 20 with one of the other optical connectors 10', 10" being of the second and third type.

In order to avoid a complete exchange of the receptacle 200 for coupling one of the optical connectors 10' and 10" to the optical connector 20, an optical adaptor has to be arranged between the receptacle 200 and the respective optical connector 10', 10" as an intermediate component to directly couple one of the optical connectors 10', 10" to the optical connector 20 or to couple one of the optical connectors 10', 10" to a first side of the optical adaptor and to couple the existing coupling element 210 of the receptacle 200 to a second side of the optical adaptor.

FIG. 3 shows an exploded view of an arrangement of an optical assembly 1000 to couple connectorized optical cables such as preconnectorized optical cables with two optical connectors 10, 20. The optical assembly comprises an optical adaptor 100 comprising a coupling element 110, a mounting element 120 and sealing elements 130. The optical assembly 1000 further comprises a receptacle 200 to mount the optical adaptor 100. The receptacle 200 has mainly the function of the fixture 220 shown in FIG. 1 and may be fixed at a housing 300, such as a housing of a distribution closure.

The coupling element 110 is configured to provide a passageway 111 for inserting a respective ferrule of the optical connectors 10 and 20. The ferrule of the optical connector 10 is surrounded by a shroud 13 of the optical connector 10. The optical connector 10 terminates an optical cable 1 so that the optical cable 1 is a connectorized optical cable which is a preconnectorized cable in the present embodiment. The passageway 111 of the optical element 110 is further configured for inserting a ferrule 21 of the optical connector 20. The optical connector 20 may terminate the optical cable 2 so that the optical cable 2 is a connectorized and in this embodiment preconnectorized optical cable. The respective ferrule of the optical connectors 10 and 20 encapsulates a respective optical fiber of the optical cables 1 and 2. The optical element 110 is configured to optically couple the preconnectorized optical cables 1 and 2.

The optical adaptor 100 further comprises a mounting element 120 being configured to be mountable to the receptacle 200 to hold the optical adaptor 100. The mounting element 120 is configured to receive the coupling element 110 in a hollow body of the mounting element. The mounting element 120 is configured such that the optical connector 10 may be mechanically coupled to the mounting element 120.

The optical adaptor 100 may further comprise at least one sealing element 130 to provide a sealing between the optical adaptor and the receptacle 200 when the mounting element 120 is mounted to the receptacle 200. As shown in FIG. 3, the optical adaptor may comprise two sealing elements which may be configured as O-rings.

Figure 4A:
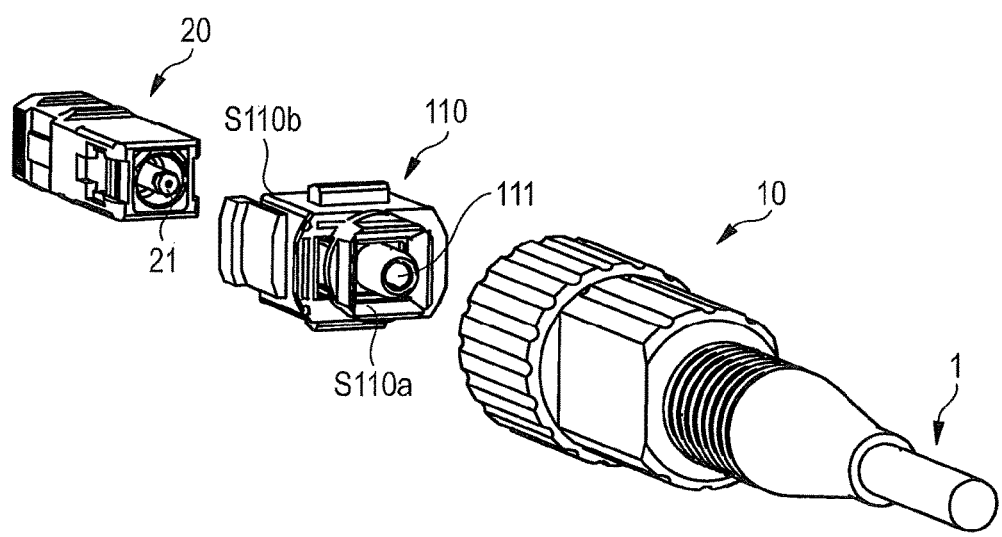
FIG. 4A shows a perspective view of a coupling element and optical connectors to couple connectorized optical cables in an unmated condition.

FIG. 4A illustrates a perspective view of the coupling element 110 and optical connectors 10 and 20 in an unmated condition. The passageway 111 of the coupling element 110 protrudes at a side 110a of the coupling element from the coupling element. The mounting element 120 is configured to mechanically couple the optical connector 10 to the mounting element 120 so that the ferrule of the optical connector 10 intrudes in the passageway 111 of the coupling element 110 at the side 110a of the coupling element 110.

The coupling element 110 has a side S110b to mechanically couple the optical connector 20 to the coupling element 110 such that the ferrule 21 of the optical connector 20 intrudes in the passageway 111 of the coupling element at the side S110b of the coupling element. The passageway 111 protrudes from the coupling element 110 at the side S110b of the coupling element.

Figure 4B:
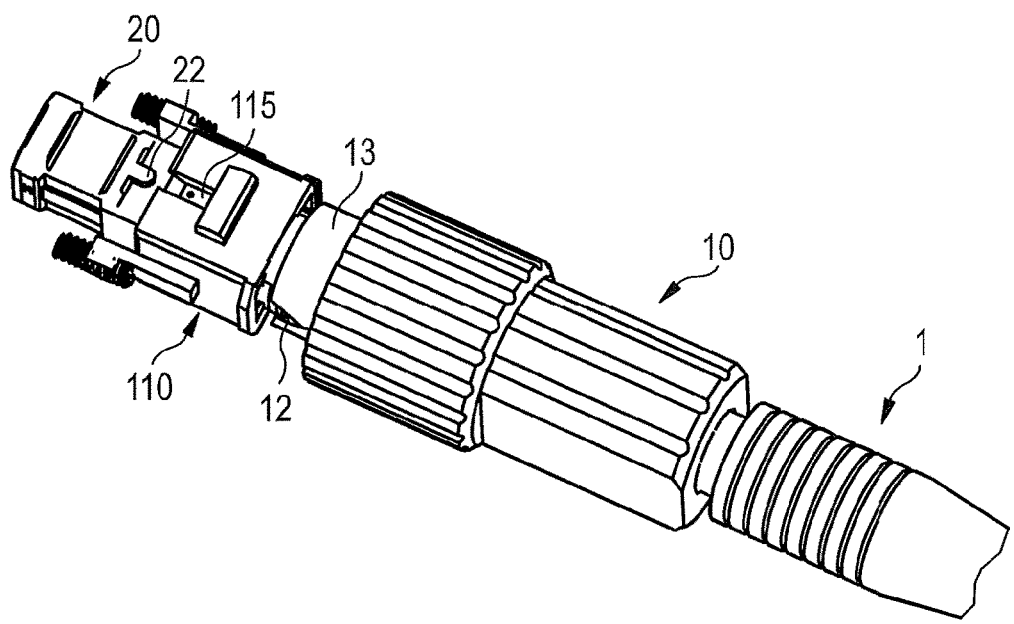
FIG. 4B shows a perspective view of a coupling element and optical connectors to couple connectorized optical cables in a mated condition.

FIG. 4B shows the components of FIG. 4A, i.e. the optical cable 1 connectorized by the optical connector 10, the coupling element 110 of the optical adaptor and the optical connector 20 in a mated condition. A surface of the coupling element 110 at the side S110a of the coupling element may be formed such that the shroud 13 of the optical connector 10 may be slid on the coupling element 110 to mechanically couple the optical connector 10 to the coupling element 110. In the coupled state of the optical connector 10 and the coupling element 110 the ferrule of the optical connector 10 intrudes in the passageway 111 of the coupling element 110.

FIG. 4B shows the optical connector 20 being mechanically coupled to the coupling element 110 by inserting the optical connector 20 at the side S110b of the coupling element in the coupling element. The coupling element 110 may comprise an alignment element 115 to direct the insertion of the optical connector 20 to the coupling element 110 in the right direction. The optical connector 20 may comprise an appropriate alignment element 22 having a complementary shape in relation to the alignment element 115 of the coupling element 110. The optical connector 20 may be configured as a connector of an industrial standard SC type.

Figure 5A:
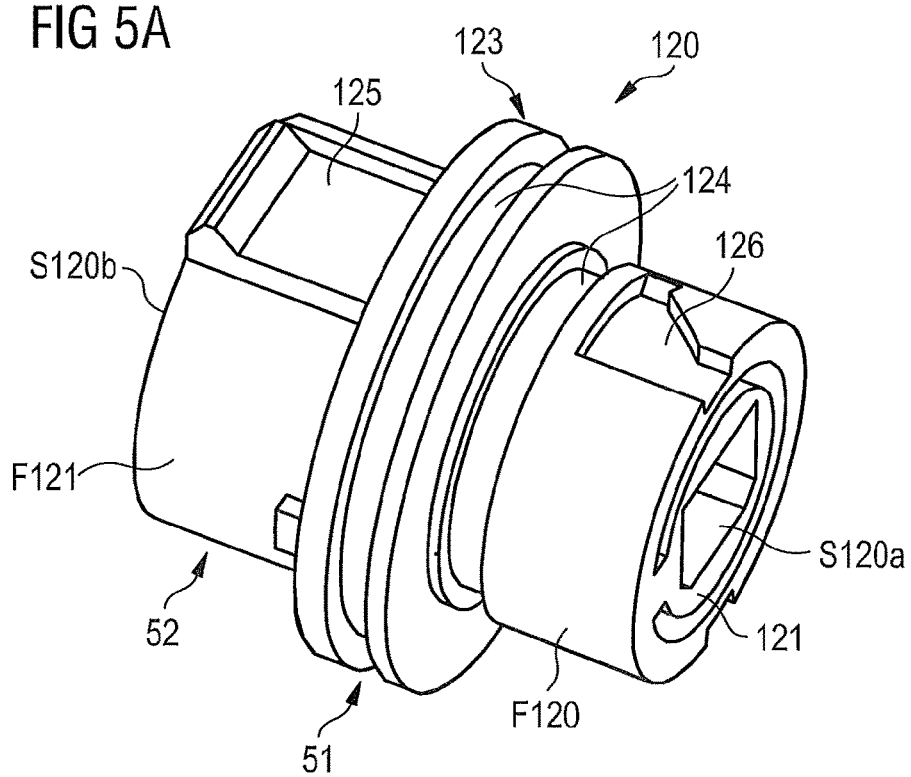
FIG. 5A shows a perspective view of a mounting element of an optical adaptor from a first direction.
Figure 5B:
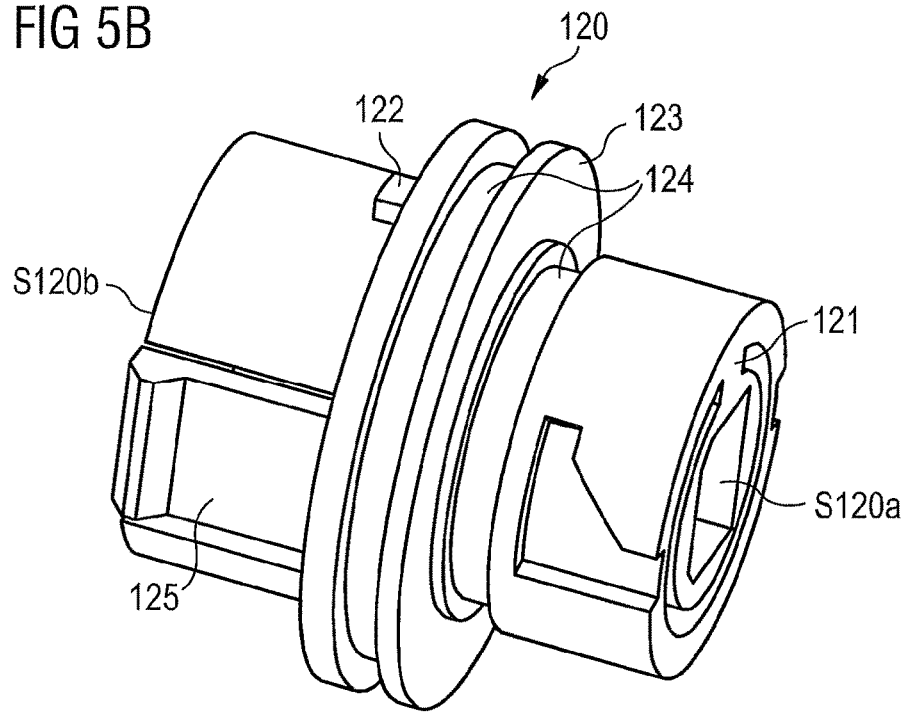
FIG. 5B shows a perspective view of a mounting element of an optical adaptor from a second direction.

FIG. 5A and FIG. 5B show a perspective view of the mounting element 120 from different viewing directions. The mounting element 120 may be formed as a hollow body having a side S120a with an opening to receive the optical connector 10 in the hollow body of the mounting element 120. The mounting element 120 may comprise an alignment element 121 extending from the opening at the side S120a of the mounting element 120 into the hollow body of the mounting element 120. The alignment element 121 of the mounting element 120 may be configured to engage in an alignment element 12 of the optical connector 10 to direct the insertion of the optical connector 10 to the mounting element 120.

FIG. 4B shows the optical connector 10 comprising the alignment element 12. The alignment element 12 may be configured as a cavity disposed in the shroud 13 of the optical connector 10. The alignment element 121 of the mounting element 120 may be configured as a stay in the interior of the hollow body of the mounting element 120 which intrudes in the cavity 12 of the shroud 13 of the optical connector 10 when the optical connector 10 is mounted to the mounting element 120. The engagement of the alignment element 121 of the optical adaptor and the alignment element 12 of the optical connector 10 ensures that the optical connector 10 can only be coupled in a predefined direction to the mounting element 120 and thus to the optical adaptor 100.

As shown in FIG. 5A, the mounting element 120 may be formed with an inner tube extending at the side S120a inside of the hollow body of the mounting element such that a small gap/channel for inserting the shroud 13 of the optical connector 10 is formed between the outer wall of the mounting element and the inner tube. The alignment element 121 may be formed as a stay located in the gap/channel between the outer wall of the mounting element 120 and the inner tube.

The mounting element 120 is configured to receive the optical connector 20 in an opening of the hollow body of the mounting element 120 at the side S120b. The mounting element 120 may comprise an outer surface F120 having a section S1 which is formed as a shoulder 123. The shoulder 123 is located between the side S120a and the side S120b of the mounting element 120. The mounting element 120 is configured such that the shoulder 123 abuts on the receptacle 200 when the mounting element 120 is mounted to the receptacle 200.

The mounting element 120 may comprise an alignment element 122 illustrated in FIG. 5B which is configured to direct the insertion of the mounting element 120 to the receptacle 200. The alignment element 122 may be formed as a nose protruding from the shoulder 123. The receptacle 200 comprises a complementarily shaped alignment element which fits to the alignment element 122 such that the alignment element 122 of the mounting element 120 and the appropriate alignment element of the receptacle 200 engage when the mounting element 120 is inserted in the receptacle 200 in the right direction. The alignment element 122 and the complementarily formed alignment element of the receptacle ensure that the mounting element 120 may be inserted only in a predefined direction into the receptacle 200.

The mounting element 120 may comprise at least one notch 124 in which the sealing element 130 may be disposed. According to the embodiment of the mounting element 120 shown in FIGS. 5A and 5B a first notch is provided in the shoulder 123 and a second notch is provided in the surface F120 of the mounting element between the shoulder 123 and the side S120a of the mounting element. Each of the notches may be configured to receive one of the sealing elements 130 which may respectively be formed as an O-ring.

The mounting element 120 may further comprise a fixing element 125 to fix the mounting element 120 to the receptacle 200. The fixing element 125 may be formed as a snap hook being configured to engage in a structure of the receptacle 200 to fix the mounting element 120 to the receptacle 200. As shown in the embodiment of the mounting element 120 of FIGS. 5A and 5B the snap hook may be formed as a part of the surface F121 of the mounting element 120 between the side S120b of the mounting element and the shoulder 123.

The mounting element 120 may comprise a securing means 126 which may be configured to mount the optical connector 10 to the mounting element 120. The securing means 126 may be formed as a bayonet locking mechanism to mechanically couple the optical connector 10 to the mounting element 120. The optical connector 10 may comprise an engagement means having a complementary shape in relation to the securing means 126 so that the engagement means of the optical connector 10 may engage in the securing means 126 of the mounting element 120 when the optical connector 10 is coupled to the mounting element 120. The securing means 126 may also comprise other structures to performa secure mounting of the mounting element 120 with regard to the optical connector 10. The mounting element may comprise a thread or a snap hook disposed within its surface F120 in lieu of a bayonet locking mechanism 126. In this case, the optical connector 10 comprises the complementary element such as a thread and a protrusion to receive the snap hook, resp.

Figure 6:
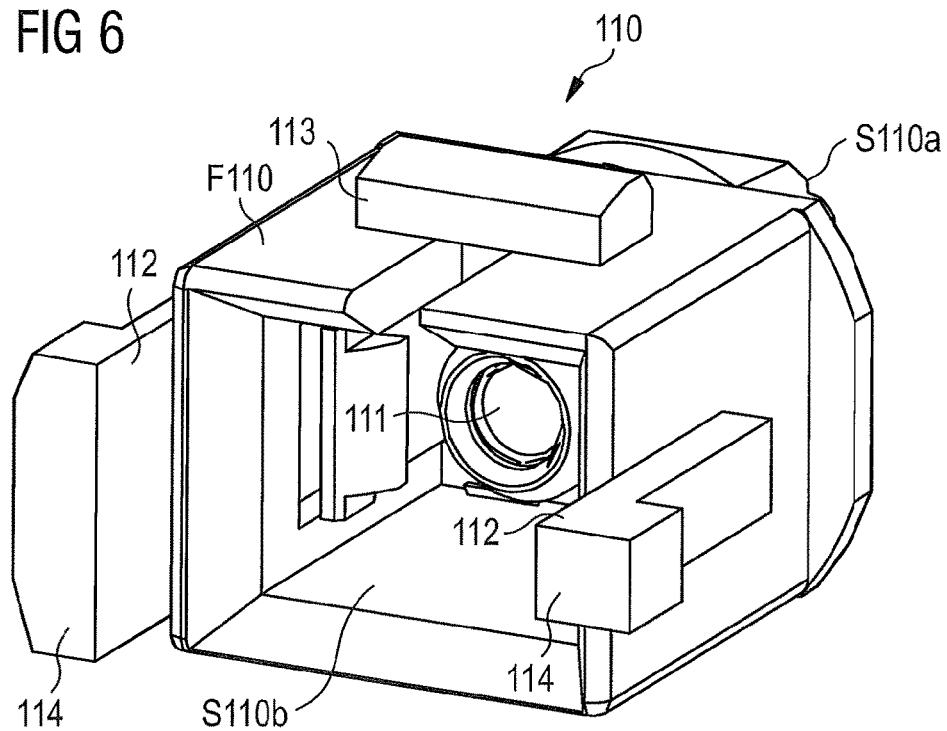
FIG. 6 shows a perspective view of an optical element of an optical adaptor.

FIG. 6 shows a perspective view of an embodiment of the coupling element 110. The coupling element 110 comprises the passageway 111 which is formed as a sleeve with a notch in the hollow body of the coupling element 110 so as to allow precise alignment of optical ferrules. The passageway 111 extends between the side S110a and the side S110b of the coupling element 110. The coupling element 110 may comprise at least one alignment element 112 to direct the insertion of the coupling element 110 into the receptacle 200. FIG. 6 shows an embodiment of the coupling element 110, wherein the coupling element 110 comprises two alignment elements 112 being configured as fingers extending from a base part of the coupling element 110 beyond the opening at the side S110b of the coupling element. The fingers 112 have a different shape so that the coupling element 110 can be inserted in the receptacle 200 only in one predefined direction, if the receptacle is provided with an appropriate alignment element in which the alignment element 112 engages when inserting the coupling element 120 in the receptacle 200.

According to an embodiment of the optical adaptor 100, the coupling element 110 may comprise an abutment element 113 which is configured to enable that the fixing element 125 of the mounting element 120 engages to the receptacle 200 to fix the mounting element 120 to the receptacle 200 when the coupling element 120 is installed in the receptacle 200 and the coupling element 120 is mounted to the receptacle 200. The abutment element 113 may be configured as a nose protruding from the outer surface F110 of the coupling element 110.

Figure 7:
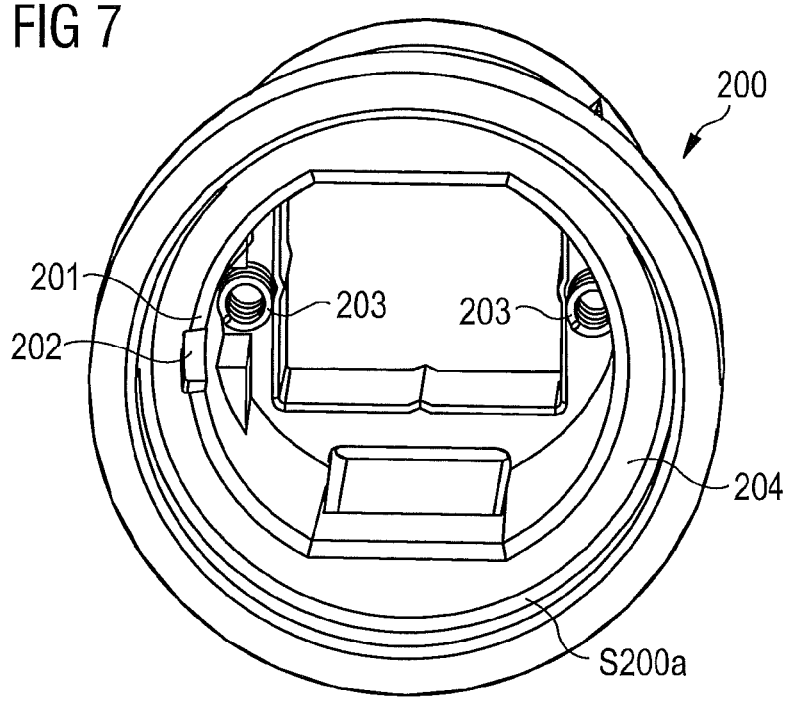
FIG. 7 shows a perspective view of a receptacle to hold an optical adaptor.

FIG. 7 illustrates a perspective view of the receptacle 200 from a side S200a which is directed in the embodiment of the optical assembly shown in FIG. 3 to optical connector 10. The receptacle 200 is configured to hold the optical adaptor 100 and thus corresponds to the fixture 220 of the receptacle shown in FIG. 1. The receptacle 200 is formed as a hollow body to receive the coupling element 110 which may be inserted in the hollow body of the receptacle from the side S200a of the receptacle. The receptacle 200 is further configured to receive the mounting element 110 which may also be inserted from the side S200a of the receptacle into the hollow body of the receptacle 200.

The receptacle 200 may comprise an alignment element 201 being formed with a complementary shape related to the alignment element 112 of the coupling element 110 to direct the insertion of the coupling element 110 into the receptacle 200. The alignment element 201 may be formed as a cavity in the inner surface of the receptacle 200. The alignment element 112 of the coupling element 110 intrudes in the cavity 201 of the receptacle 200 when the coupling element 110 is inserted in the receptacle 200 in a predefined direction.

The receptacle 200 may comprise another alignment element 202 being formed with a complementary shape related to the alignment element 122 of the mounting element 120 to direct the insertion of the mounting element 120 into the receptacle 200. The alignment element 202 of the receptacle 200 may be configured as a cavity in the inner surface of the receptacle 200. As shown in FIG. 5B, the alignment element 122 of the mounting element 120 may be configured as a nose or protrusion which is arranged at the shoulder 123 of the mounting element. The alignment element 122 intrudes in the cavity 202 of the receptacle 200 when the mounting element 120 is inserted in the hollow body of the receptacle 200 in the predefined direction. The alignment elements 112, 122 of the coupling element 110 and the mounting element 120 prevent the coupling element 110 and the mounting element 120 from rotating inside the hollow body of the receptacle 200.

According to a possible embodiment of the receptacle 200 the receptacle 200 comprises a spring element 203 being configured to push the coupling element 110 against the optical connector 10 when the optical connector 10 is mechanically coupled to the mounting element 120. According to a possible embodiment of the optical adaptor 100 a surface 114 of the alignment element 112 may be used as contact surface to support the spring element 203.

According to a possible embodiment of the optical assembly 1000 the receptacle 200 comprises an engagement area 204 being formed for engaging of the fixing element 125 of the mounting element 120 to the receptacle 200 when the coupling element 110 and the mounting element 120 are disposed in the hollow body of the receptacle 200.

Figure 8:
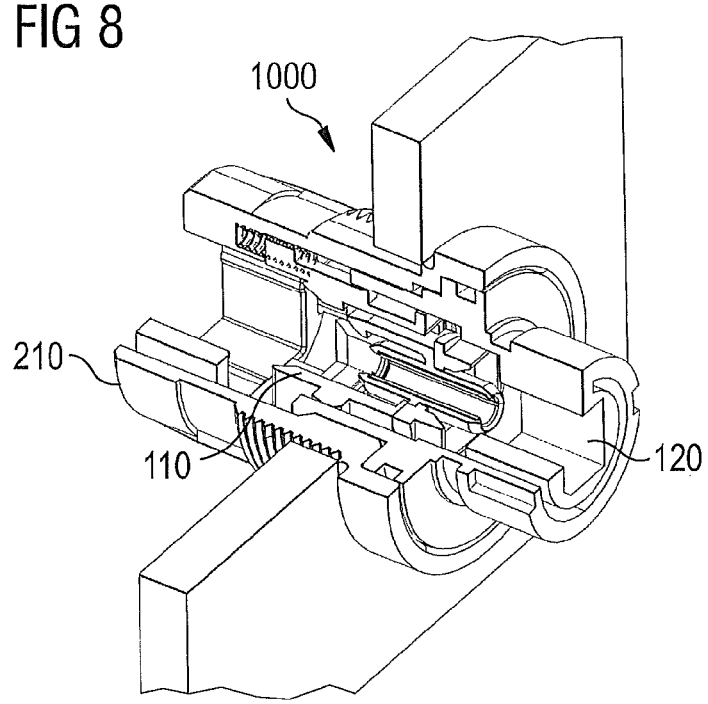
FIG. 8 shows a perspective sectional view of an optical assembly to couple connectorized optical cables.

FIG. 8 shows the optical assembly 1000 to optically couple connectorized cables such as preconnectorized optical cables in a mated condition. The coupling element 110 is inserted from the side S200a into the hollow body of the receptacle 200 such that the spring element 203 is pressed against the contact surface 114 of the alignment element 112 of the coupling element 110. The mounting element 120 is also inserted from the side S200a into the hollow body of the receptacle 200 such that the shoulder 123 abuts on the receptacle 200 when the mounting element 120 is mounted to the receptacle 200.

Figure 9A:
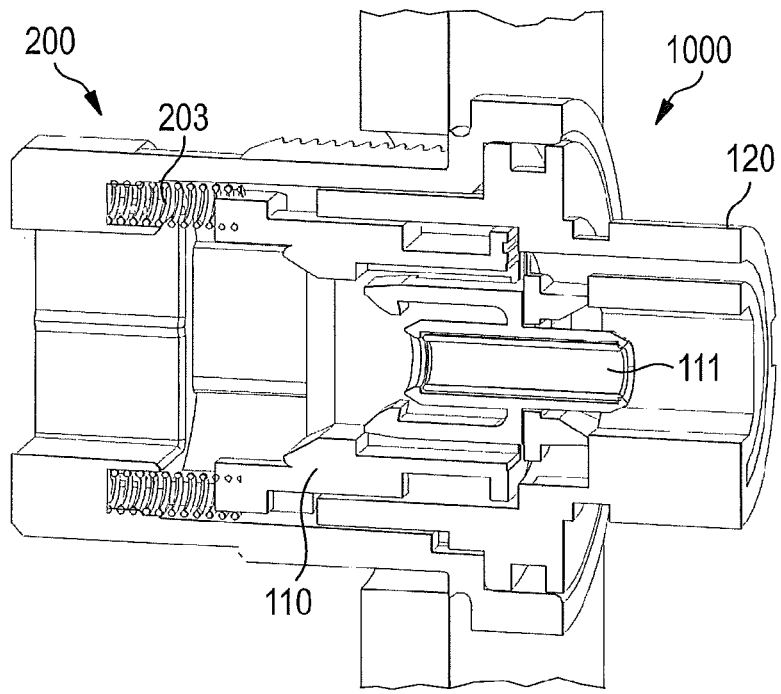
FIG. 9A shows a cross-sectional view of an optical assembly to couple connectorized optical cables from a first direction.

FIG. 9A shows a cross-sectional view of the optical assembly 1000 from a first viewing direction. The optical assembly 1000 comprises the optical adaptor 100 and the receptacle 200 in a mated condition. The passageway 111 is centrally arranged in the hollow body of the coupling element 110 of the optical adaptor.

Figure 9B:
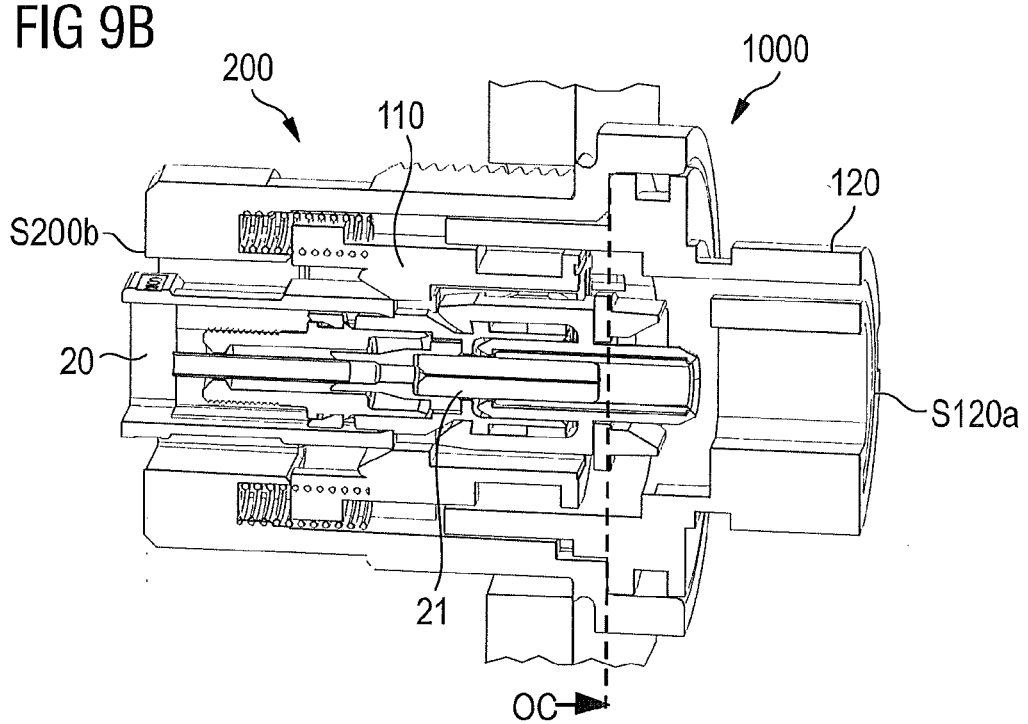
FIG. 9B shows a perspective view of an optical assembly to couple connectorized optical cables with an inserted optical connector from the first direction.

FIG. 9B shows the optical assembly 1000 of FIG. 9A, wherein the optical connector 20 is inserted from a side S200b opposite to the side S200a of the receptacle into the hollow body of the receptacle 200. The optical connector 20 comprises the ferrule 21 which is coupled to an optical fiber of the optical cable 2. When the optical connector 20 is inserted from the side S200b in the optical assembly, the ferrule 21 of the optical connector 20 intrudes in the passageway 111 of the optical adaptor 100. The dashed line shows the area, where the ferrule 21 of the optical connector 20 abuts against the ferrule of the optical connector 10 when the optical connector 10 is mechanically coupled to the optical assembly 1000 at the side S120a of the mounting element 120. The ferrule is inserted into the sleeve having at least on notch to achieve precise alignment.

FIG. 9B shows line OC which represents the plane in which optical coupling between the ferrules connected to respective the to be connected optical fibers takes place. The inner surface and the inner structure of the mounting element 120 must be adapted to the optical connector 10 to be inserted into the mounting element 120. The inner structure of the mounting element 120 must be adapted to the outer surface of the to be received optical connector 10 including its ferrule 11 comprised in the optical connector 10. Specifically, the diameter of the cavity of the mounting element 120 must be adapted to the diameter of the to be received connector 10. In order to provide sufficient space in the cavity provided by mounting element 120, depending of the type and shape of the to be received connector, the plane represented by line OC may move closer to the left end S200b.

Figure 10A:
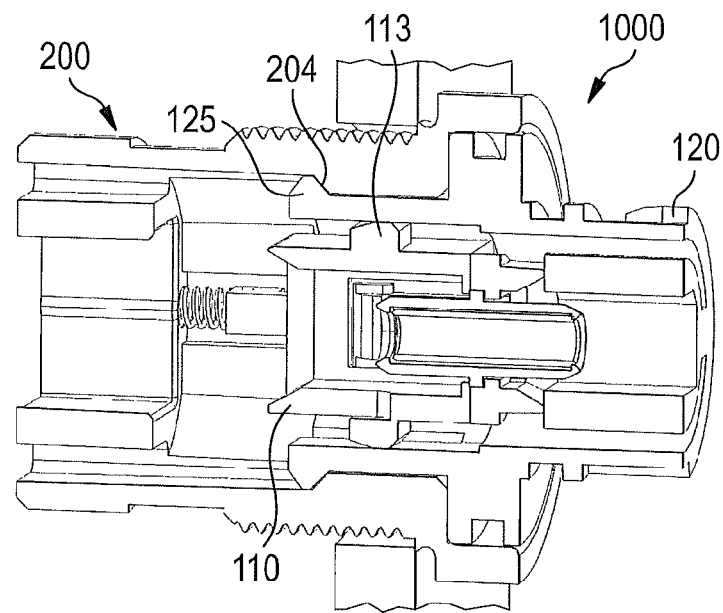
FIG. 10A shows a cross-sectional view of an optical assembly to couple connectorized optical cables from a second direction.
Figure 10B:
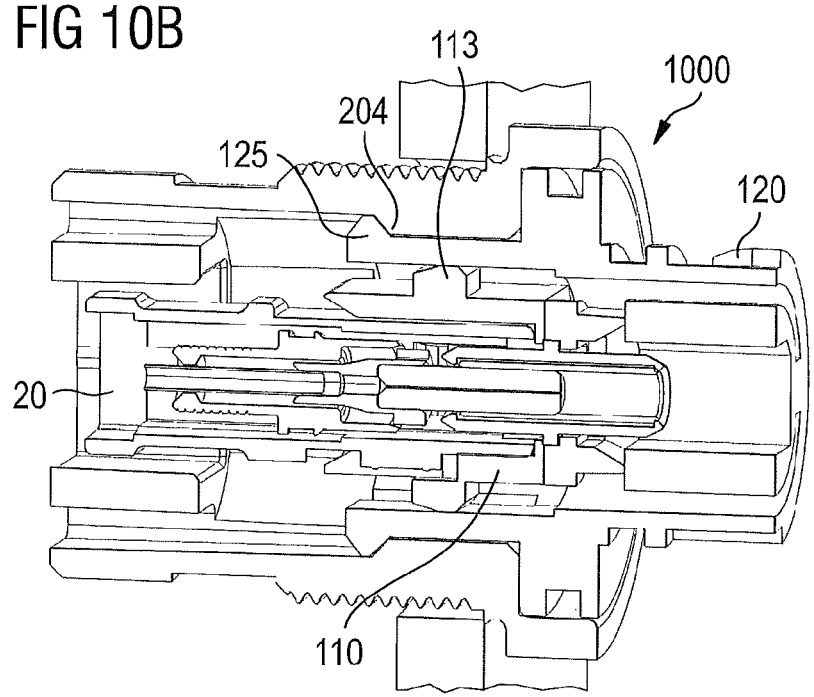
FIG. 10B shows a cross-sectional view of an optical assembly to couple connectorized optical cables with an inserted optical connector from the second direction.

FIG. 10A and FIG. 10B show a cross-sectional view of the optical assembly 1000 from a second viewing direction. The optical assembly 1000 comprises the optical adaptor 100 and the receptacle 200 in a mated condition. The abutment element 113 of the coupling element 110 abuts on the fixing element 125 of the mounting element 120 when the optical connector 10 is coupled to the mounting element 120 so that the fixing element 125, for example a snap hook, of the mounting element 120 engages in the engagement area 204 of the receptacle 200.

Figure 11:
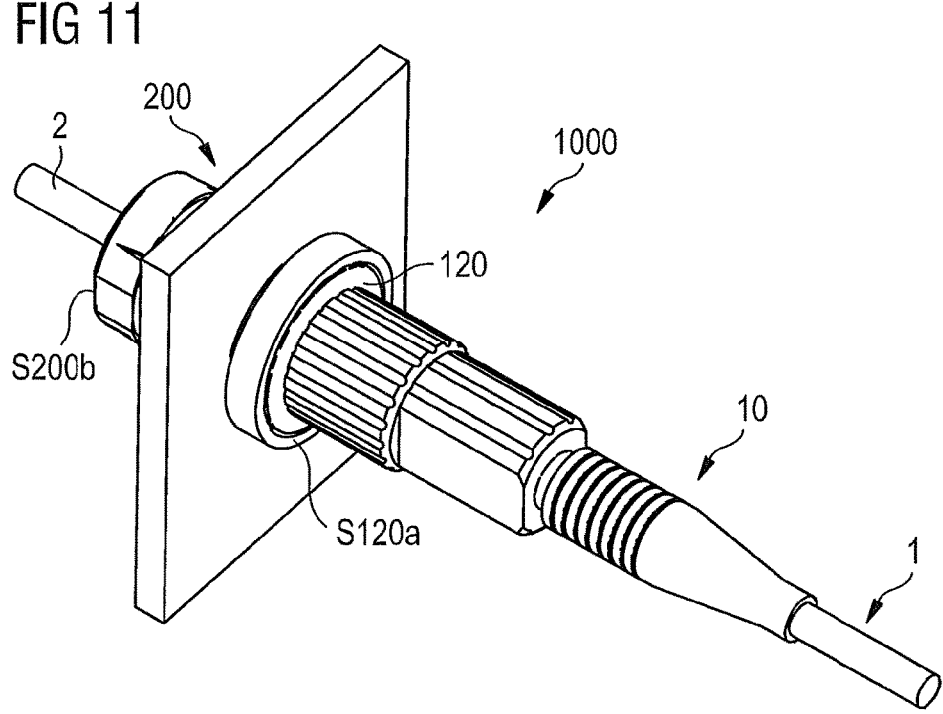
FIG. 11 shows a connectorized optical cable coupled to an optical assembly to couple connectorized optical cables.

FIG. 11 shows preconnectorized optical cables 1 and 2 which are optically coupled by the optical assembly 1000. The optical connector 10 which terminates optical cable 1 is mounted to the side S120a of the mounting element 120. The optical connector 20 which terminates the optical cable 2 is inserted in the optical assembly 1000 at side S200b of the receptacle 200.

Figure 12A:
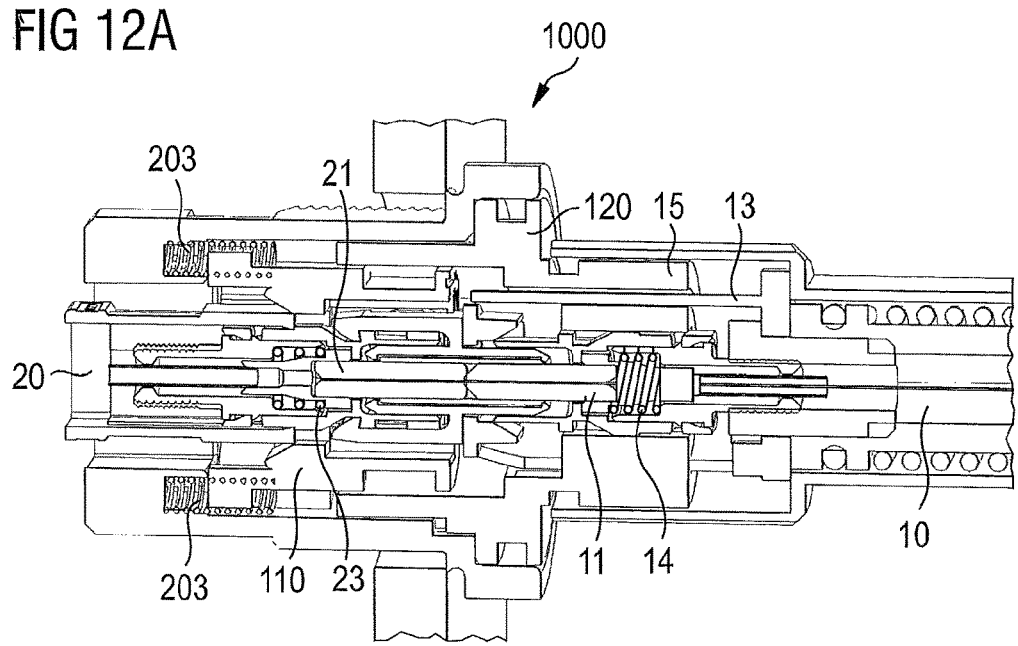
FIG. 12A shows a cross-sectional view of an optical assembly to couple connectorized optical cables with inserted optical connectors from a first direction.
Figure 12B:
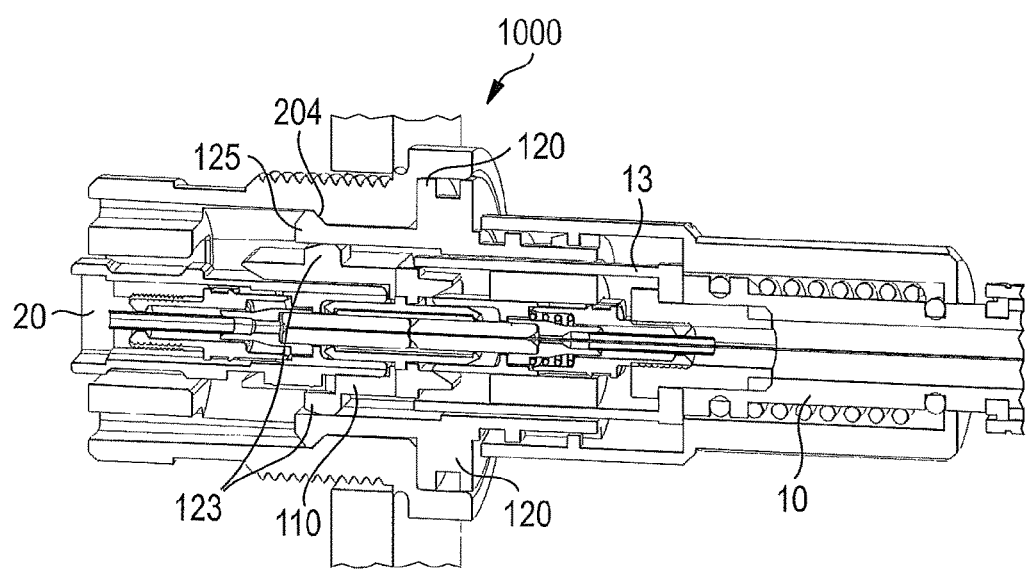
FIG. 12B shows a cross-sectional view of an optical assembly to couple connectorized optical cables with inserted optical connectors from a second direction.

FIG. 12A shows a cross-sectional view of the optical assembly 1000 from the first viewing direction as shown in FIGS. 9A and 9B, wherein the optical connector 10 is mounted to the mounting element 120 and optical connector 20 is inserted in the receptacle 200 at the side S200b and is mounted to the coupling element 110. FIG. 12B shows the cross-sectional view of the optical assembly 1000 coupled to the optical connectors 10 and 20 from the second viewing direction as shown in the FIGS. 10A and 10B.

When the optical connector 10 is mechanically coupled to the optical assembly 1000, the shroud 13 intrudes at the side S120a of the mounting element in the channel/gap 15 of the mounting element 120 between the outer wall and the inner tube of the mounting element and abuts against the coupling element 110. The spring element 203 presses the coupling element 110 against the shroud 13 of the optical connector 10 such that the coupling element 110 is moved backwards in the direction towards optical connector 20. The movement of the coupling element 110 caused by the inserting of the shroud 13 of the optical connector 10 inside the optical assembly is shown in FIG. 12A by the arrows.

As shown in FIG. 12B in comparison to FIGS. 10A and 10B, the abutment element 113 is moved backwards by the rearward movement of the coupling element 110 such that the abutment element 113 presses against the fixing element 125 of the mounting element 120. As a consequence, the fixing element 125 engages in the engagement area 204 of the receptacle 200 so that the mounting element 120 cannot be removed from the receptacle 200 when the optical connector 10 is mechanically coupled to the optical assembly. The noses of the abutment element 113 ensure a reliable strain relief between the mounting element 120 and the receptacle 200.

The spring element 204 may comprise two springs being arranged symmetrically inside of the receptacle 200. The spring element 204 mainly fulfill two functions. The first function is to push the coupling element 110 against the optical connector 10 for releasing the locking mechanism of the fixing element 125. The second function is that the pressure of the ferrules 11 and 21 is defined by all spring elements working together, i.e. the spring element 204 of the receptacle 200 and a spring element 14 of the optical connector 10 as well as a spring element 23 of the optical connector 20. It is essential that the spring element 14 of optical connector 10 and the spring element 23 of optical connector 20 located in the connectors 10, 20 itself are suited to each other so that the spring element 204 in the receptacle 200 may have a minor contribution to the ferrule pressing.

What is claimed is:

1. An optical adaptor for mounting to a receptacle to optically couple connectorized optical cables, comprising:
a coupling element to provide a passageway for inserting a ferrule of a first optical connector to terminate a first one of the connectorized optical cables and a ferrule of a second optical connector to terminate a second one of the connectorized optical cables to optically couple the first and the second connectorized optical cable, a mounting element being mountable to a receptacle to hold the optical adaptor, the mounting element being configured to receive the coupling element and the mounting element has a second side with an opening to receive the second optical connector, wherein a section of an outer surface of the mounting element is formed as a shoulder located between the first side and the second side of the mounting element and the shoulder abuts on the receptacle when the mounting element is mounted to the receptacle;

wherein the mounting element comprises a securing means to mount the first optical connector to the mounting element wherein the mounting element is configured to mechanically couple the first optical connector to the mounting element so that the ferrule of the first optical connector intrudes in the passageway of the coupling element at a first side of the coupling element, wherein the coupling element has a second side to mechanically couple the second optical connector to the coupling element such that the ferrule of the second optical connector intrudes in the passageway of the coupling element.

2. The optical adaptor of claim 1, wherein the mounting element is formed as a hollow body having a first side with an opening to receive the first optical connector in the hollow body, wherein the mounting element comprises a first alignment element extending from the opening at the first side of the mounting element into the hollow body of the mounting element, wherein the first alignment element of the mounting element is configured to engage in an alignment element of the first optical connector to direct the insertion of the first optical connector to the mounting element.

3. The optical adaptor of claim 2, wherein the mounting element comprises at least one second alignment element to direct the insertion of the mounting element to the receptacle.

4. The optical adaptor of claim 2, wherein the mounting element is formed with an inner tube extending at a first side of the hollow body of the mounting element such that a gap for inserting a shroud of the first optical connector is formed between an outer wall of the mounting element and the inner tube.

5. The optical adapter of claim 4, wherein an alignment element is formed as a stay located in the gap between the outer wall of the mounting element and the inner tube.

6. The optical adaptor of claim 1, comprising:

a sealing element to provide a sealing between the mounting element and the receptacle, wherein the mounting element comprises at least one notch to dispose the sealing element.

7. The optical adaptor of claim 1, wherein the mounting element comprises a fixing element to fix the mounting element to the receptacle.

8. The optical adaptor of claim 7, wherein the fixing element is formed as a snap hook being configured to engage in a structure of the receptacle to fix the mounting element to the receptacle.

9. The optical adaptor of claim 7, wherein the coupling element comprises an abutment element being configured to engage the fixing element to the receptacle to fix the mounting element to the receptacle when the coupling element is disposed in the receptacle and the mounting element is mounted to the receptacle.

10. The optical adaptor of claim 1, wherein a securing means for mounting the first optical connector is disposed on an outer surface of mounting element.

11. The optical adaptor of claim 10, wherein the securing means is a bayonet locking mechanism located on the outer surface of the first side of the mounting element.

12. The optical adaptor of claim 1, wherein the coupling element comprises an alignment element to direct the insertion of the coupling element into the receptacle.

13. An optical assembly to optically couple connectorized optical cables, comprising:

the optical adaptor for mounting to a receptacle to optically couple connectorized optical cables of claim 1, a receptacle to hold the optical adaptor, the receptacle being formed as a hollow body to receive the coupling element and the mounting element of the optical adaptor.

14. The optical assembly of claim 13, wherein the receptacle comprises a first alignment element being formed with a complementary shape related to the alignment element of the coupling element of the optical adaptor to direct the insertion of the coupling element into the receptacle, wherein the receptacle comprises a second alignment element being formed with a complementary shape related to the second alignment element of the mounting element of the optical adaptor to direct the insertion of the mounting element into the receptacle.

15. The optical assembly of claim 13, wherein the receptacle comprises a spring element being configured to push the coupling element of the optical adaptor against the first optical connector when the first optical connector is mechanically coupled to the mounting element of the optical adaptor.

16. The optical assembly of claim 15, wherein the alignment element of the coupling element of the optical adaptor has a contact surface to support the spring element.

17. The optical assembly of claim 13, wherein the receptacle comprises an engagement area being formed to engage the fixing element of the mounting element to the receptacle when the coupling element and the mounting element are disposed in the hollow body of the receptacle.

* * * * *

UNITED STATES PATENT AND TRADEMARK OFFICE
CERTIFICATE OF CORRECTION

PATENT NO. : 9,915,789 B2
APPLICATION NO. : 15/435548
DATED : March 13, 2018
INVENTOR(S) : Joachim Rudolf Beier et al.

It is certified that error appears in the above-identified patent and that said Letters Patent is hereby corrected as shown below:

On the Title Page

On page 2, Column 2, item (56), other publications, Line 7, delete "Hardenecl" and insert -- Hardened --, therefor.

On page 2, Column 2, item (56), other publications, Line 7, delete "Solultions" and insert -- Solutions --, therefor.

In the Claims

In Column 11, Line 49, Claim 5, delete "adapter" and insert -- adaptor --, therefor.

Signed and Sealed this
Fourteenth Day of April, 2020

Andrei Iancu
*Director of the United States Patent and Trademark Office*